(12) United States Patent  
Kwong

(10) Patent No.: US 6,859,854 B2
(45) Date of Patent: Feb. 22, 2005

(54) UNIVERSAL STORAGE INTERFACE BUS

(75) Inventor: Bill Kwong, 20363 Leutar Ct., Saratoga, CA (US) 95070

(73) Assignees: Bill Kwong, Saratoga, CA (US); Victor Chuan-Chen Wu, Cupertino, CA (US)

( * ) Notice: Subject to any disclaimer, the term of this patent is extended or adjusted under 35 U.S.C. 154(b) by 555 days.

(21) Appl. No.: 09/911,450

(22) Filed: Jul. 25, 2001

(65) Prior Publication Data

US 2003/0032333 A1 Feb. 13, 2003

(51) Int. Cl.[7] .............................................. G06F 13/00
(52) U.S. Cl. ......................... 710/315; 710/302; 439/43; 439/638; 361/685
(58) Field of Search ................................ 710/301–304, 710/313, 315; 361/684, 685; 439/43, 638

(56) References Cited

U.S. PATENT DOCUMENTS

| | | | | |
|---|---|---|---|---|
| 5,297,067 A | * | 3/1994 | Blackborow et al. | 710/305 |
| 5,941,965 A | * | 8/1999 | Moroz et al. | 710/303 |
| 6,560,099 B1 | * | 5/2003 | Chang | 361/685 |

* cited by examiner

Primary Examiner—Glenn A. Auve
(74) Attorney, Agent, or Firm—Troxell Law Office PLLC

(57) ABSTRACT

A Universal Storage Interface Bus external storage device includes an IDE storage device, a ribbon cable, an USIB connector conversion board, an USIB interface conversion device containing an USIB interface conversion board, and an interface cable. The IDE data storage device couples with a first connector of the ribbon cable and the ribbon cable further has a second connector. The USIB connector conversion board has a third connector and a fourth connector, and the third connector couples with the second connector for converting a signal of the third connector into a signal of the fourth connector. The USIB interface conversion cable device provides a fifth connector, an USIB interface conversion board, and a sixth connector. A cable is between and connecting with the USIB interface conversion board and the sixth connector. The fifth connector couples with the fourth connector and the sixth connector thereof couples with an input/output port of a personal computer. The personal computer can connect with the data storage device by way of replacing the USIB interface conversion cable device in case of the input/output port providing an interface thereof different from that of the data storage device for saving the expense of the user.

9 Claims, 2 Drawing Sheets

UNIVERSAL STORAGE INTERFACE BUS

BACKGROUND OF THE INVENTION

1. Field of the Invention

The present invention relates to a set of universal interface conversion device, and particularly to a universal conversion device, which is possible for a data storage device with IDE interface (including EIDE and ADAPTI storage devices) to connect with the input/output port of a personal computer with various interfaces (such as IDE, USB, PCMCIA, or Firewire).

2. Description of Related Art

It is known that there are different types of input/output ports (such as IDE, USB, PCMCIA, and Firewire or IEEE-1394) available for a personal computer nowadays to connect with various kinds of data storage devices, especially the external data storage devices. Due to the progress of technology, a lot of newer and faster input/output ports are developed to adapt with the personal computer, and it means various kinds of external data storage devices can be connected to the personal computer via different interfaces.

Referring to FIG. 1, a conventional external data storage device illustrated comprises an enclosure (not shown in the diagram for simplicity) that contains a data storage device 10, a ribbon cable 20 and an interface conversion circuit board 30. The data storage device can be a hard disk drive, CD-RW, or DVD, and the hard disk drive is used as an explanatory storage device. The data storage device 10 further has a IDE interface. The ribbon cable 20 has a female IDE interface connector 21 to connect with a male IDE interface connector 11 on the data storage device 10 and connect with another female IDE interface connector 22. The interface conversion circuit board 30 further comprises a male IDE interface connector 31, an Application Specific Integrated Circuit (ASIC) 32, and a female interface connector 33. The male IDE interface connector 31 connects with the female IDE interface connector 22 and the integrated circuit 32 may convert the IDE interface signal to a second interface signal of the interface such as USB, PCMCIA or Firewire. The interface cable 40 has a male interface connector 41 to connect with the female interface connector 33 and the other end thereof (not shown) connects with the input/output port of a personal computer.

The preceding conventional arrangement makes the data storage device 10 only possible to connect with a corresponding input/output port on the personal computer in accordance with the type of the integrated circuit 32. For instance, if the integrated circuit 32 is a circuit for converting the IDE interface to the USB interface only, the data storage device 10 is restricted to connect with a personal computer with USB interface. Since the data storage device and the interface conversion circuit broad are contained inside an enclosure, if the personal computer has a PCMCIA interface instead of IDE interface, the entire interface conversion circuit board has to be changed to another interface conversion circuit board that can convert the IDE interface to the PCMCIA interface, and the interface cable 40 has to be replaced too. When the data storage device 10 is to be connected to an input/output port with various interfaces, various interface conversion circuit boards 30 and interface cables 40 have to be prepared in advance. The replacement of the interface conversion circuit board requires disassembling and reassembling the enclosure, which often time require special tools and thus cause great inconvenience or difficulty for non-technical users, such that the user may incur a burden of increased cost and an inconvenience in use.

In order to flexibly connect with the personal computer, the external data storage device in this invention is designed to consists of a storage enclosure (which is not shown in the drawing for simplicity) that contains a data storage device 10, a connector conversion circuit board 50, which is defined here as the Universal Storage Interface Bus (USIB) connector conversion board and an USIB interface conversion cable 60. The data storage device is connected to the USIB connector conversion board by way of a standard ribbon cable inside a storage enclosure to form the external storage device, exposing only the MC-36 connector 52 for connecting with the USIB interface conversion cable 60 when in use. The USIB connector broad, that converts a typical IDE connector to a standard MC-36 female connector, has a defined pin out assignment listed in Table 2 and this defined pin out assignment is called Universal Storage Interface Bus (USIB) in the text of the present invention. At one end of the interface cable 63 is a dongle 60 that encloses an interface conversion circuit board, which is defined here as the USIB interface conversion board. The USIB interface conversion board converts the IDE interface signals coming out from the MC-36 connector to USB, Firewire, PCMCIA or other input/output (I/O) interfaces depending on the type of interface conversion ASIC that is included in the USIB interface conversion board. While in use, the connector 62 of the interface cable 63 is attached to the connector 52 of the USIB connector conversion board and the other end of the cable 63 is attached to the I/O port of the computer which is not shown in the diagram for simplicity. Using this design, the same external storage device can be attached to computers via USB, PCMCIA, Firewire or other I/O ports by simply attaching the appropriate USIB interface conversion cable to the connector 52 of the external storage device. Users no longer need to disassemble and reassemble the external storage when changing to different I/O interfaces, as is the case with the conventional design.

Since the USIB connector conversion board converts the different IDE connector from all different IDE storage devices to a standard MC-36 connector with same USIB electrical pin out, different external storage devices that incorporated the USIB connector conversion board can all share the same USIB interface conversion cable. So the design of USIB may not only offer a feature of increasing the flexibility of interface connection for the external data storage device but also reduce the amount of the required parts prepared by the manufacturer for different interfaces and a variety of data storage device. Table 1 shown hereinafter is a contrast between the conventional design and the USIB design of external storage device.

TABLE 1

| DEVICE TYPE | NUMBER OF DRIVES | CABLE | NUMBER OF CABLES |
|---|---|---|---|
| CONVENTIONAL MODE | | | |
| External USB CDRW | 1 | USB | 1 |
| External Firewire CDRW | 2 | Firewire | 2 |
| External PCMCIA CDRW | 3 | PCMCIA | 3 |
| Other External CDRW | 4 | Others | 4 |
| External USB HD | 5 | USB | 1 |
| External Firewire HD | 6 | Firewire | 2 |
| External PCMCIA HD | 7 | PCMCIA | 3 |
| Other External HD | 8 | Others | 4 |
| External USB DVD | 9 | USB | 1 |
| External Firewire DVD | 10 | Firewire | 2 |

TABLE 1-continued

| DEVICE TYPE | NUMBER OF DRIVES | CABLE | NUMBER OF CABLES |
|---|---|---|---|
| External PCMCIA DVD | 11 | PCMCIA | 3 |
| Other External DVD | 12 | Others | 4 |
| TOTAL | 12 | | 4 |
| USIB MODE | | | |
| External CDRW with USIB connection | 1 | USB USIB interface cable | 1 |
| External CDRW with USIB connection | 1 | Firewire USIB interface cable | 2 |
| External CDRW with USIB connection | 1 | PCMCIA USIB interface cable | 3 |
| External CDRW with USIB connection | 1 | Other USIB interface cable | 4 |
| External HD with USIB connection | 2 | USB USIB interface cable | 1 |
| External HD with USIB connection | 2 | Firewire USIB interface cable | 2 |
| External HD with USIB connection | 2 | PCMCIA USIB interface cable | 3 |
| External HD with USIB connection | 2 | Other USIB interface cable | 4 |
| External DVD with USIB connection | 3 | USB USIB interface cable | 1 |
| External DVD with USIB connection | 3 | Firewire USIB interface cable | 2 |
| External DVD with USIB connection | 3 | PCMCIA USIB interface cable | 3 |
| External DVD with USIB connection | 3 | Other USIB interface cable | 4 |
| TOTAL | 3 | | 4 |

SUMMARY OF THE INVENTION

The object of the present invention is to provide a Universal Storage Interface Bus (USIB) external storage device that can connect with an input/output port of a personal computer in spite of the input/output port providing various interfaces.

Accordingly, the crux of the USIB device of the present invention resides in that an USIB connector conversion board, and the USIB interface conversion cable are arranged to constitute the USIB external data storage device. Wherein, the USIB connector conversion board has a first and a second connectors and the first connector couples with the IDE interface of the IDE storage device via a ribbon cable. The second connector of the USIB connector conversion board is coupled with the first connector of an USIB interface conversion cable that contains the USIB interface conversion board. The second connector of the USIB interface conversion cable is then coupled to the interface input/output port of a personal computer. When the external data storage device is to be connected to various interface input/output ports of any personal computer, the only thing has to be done is to replace the USIB interface conversion cable.

BRIEF DESCRIPTION OF THE DRAWINGS

The present invention can be more fully understood by referencing to the following description and accompanying drawings, in which.

DETAILED DESCRIPTION OF THE PREFERRED EMBODIMENTS

Figure 1:
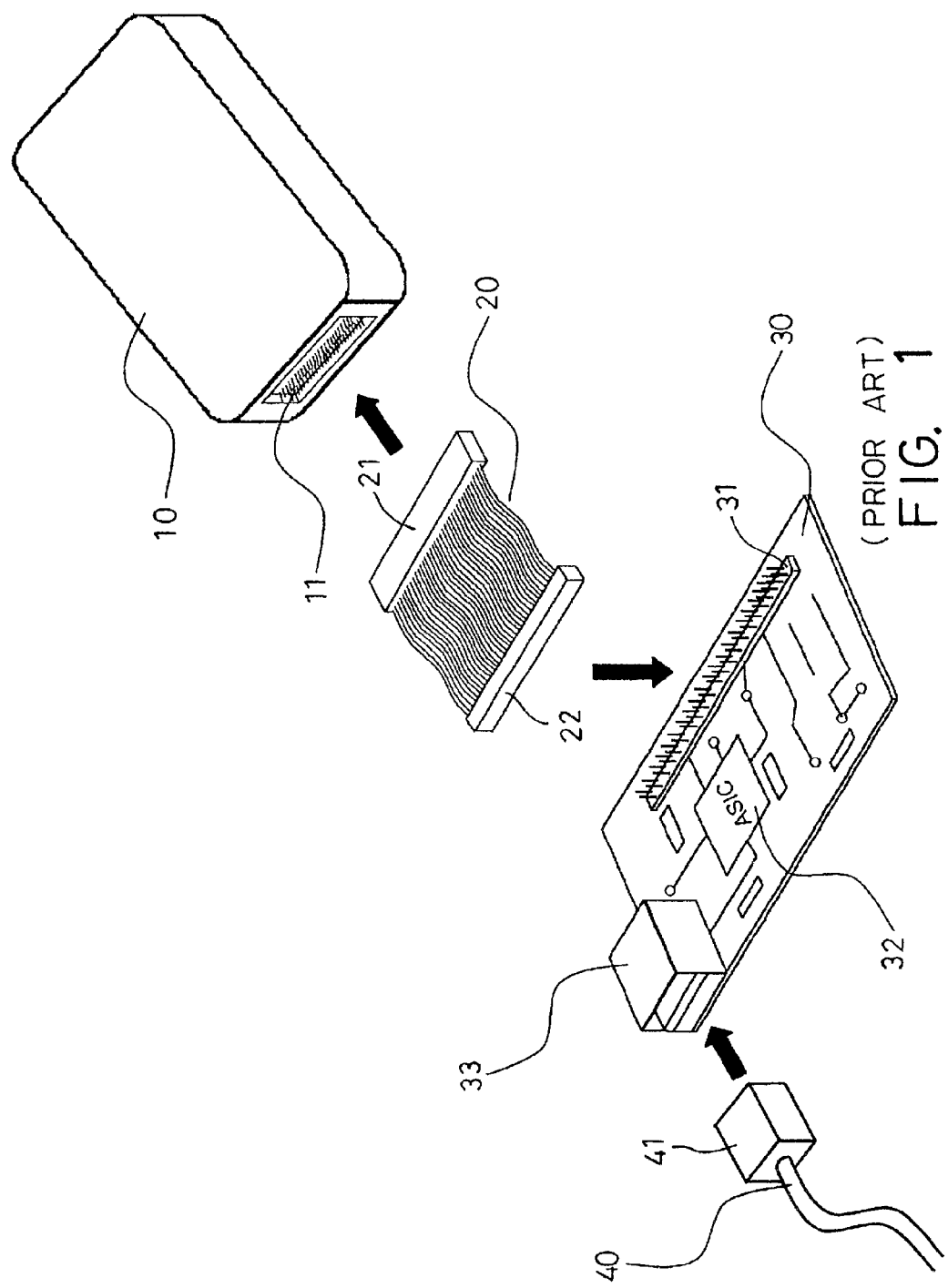
FIG. 1 is a disengaged perspective view of a conventional external data storage device illustrating the connection thereof (the enclosure that surrounds the IDE data storage device and the interface conversion board is not shown for simplicity)
Figure 2:
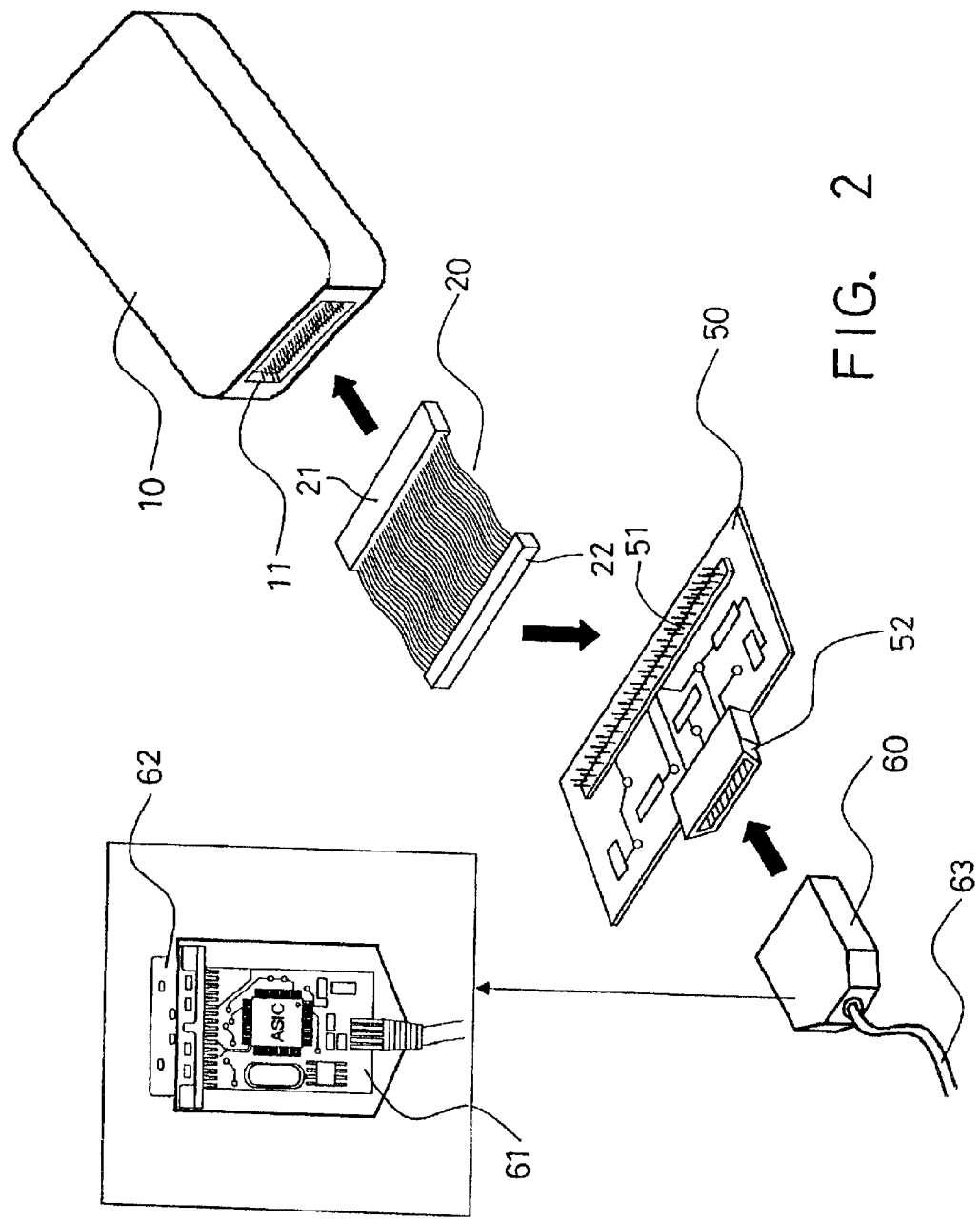
FIG. 2 is a disengaged perspective view of an external data storage device according to the present invention illustrating the connection thereof. Again the enclosure that houses the IDE storage device and the USIB connector conversion board is not shown for simplicity.

Referring to FIG. 2, a set of Universal Storage Interface Bus devices with regard to a preferred embodiment of the present invention is illustrated. The Universal Storage Interface Bus (USIB) device comprises a USIB connector conversion board 50, and an USIB interface conversion cable device 60. The ribbon cable 20 provides a first connector 21 and a second connector 22, and the first connector 21 is a female IDE connector and the second connector 22 is a male IDE connector. The first connector 21 couples with a data storage device such as hard disk, CD-RW, or DVD, which provides a first interface and it, for instance, is an IDE interface. The USIB connector conversion board 50 provides a third connector 51 and a fourth connector 52. The third connector 51 is a male IDE interface connector for coupling with the second connector 22 for converting a 50-pin signal of the IDE interface into a 36-pin signal of a Universal Storage Interface Bus with an IDE interface as well. Furthermore, the 36-pin signal is defined in a female MC-36 connector normally used by the manufacturer, that is, the fourth connector 52 mentioned in the present invention. A pin out assignment of the fourth connector is listed in table 2. The USIB interface cable device 60 provides a fifth connector 62 with an USIB interface conversion board 61, and a cable 63. The fifth connector 62 is a male MC-36 connector for coupling with the fourth connector 52 and the cable 63 has a sixth connector (not shown) to couple with the input/output ports of a personal computer.

The data storage device 10, the ribbon cable 20 and the USIB connector conversion board 50 are arranged inside an outer casing or enclosure (not shown for simplicity). The finished product of the Universal Storage Interface Bus device has all the elements therein be connected and the user is only necessary to connect one end of the USIB interface conversion cable device 60 that has the MC-36 male connector to the female MC-36 connector 52; and the other end of the USIB interface conversion cable to the input/output port of the personal computer respectively in order to mount the Universal Storage Interface Bus device of the present invention.

For instance, when the data storage device 10 is to be connected to an input/out port of the personal computer with a PCMCIA interface, it can be simply done that an USIB PCMCIA interface conversion cable 60, which is able to convert the IDE signal through the USIB interface into the PCMCIA interface, is connected to the female MC-36 connector 52 of the USIB connector conversion board 50. Then, the sixth connector (not shown) on the cable 63 is coupled to the PCMCIA interface in the input/output port of the personal computer to complete the entire connection. In this way, the data storage device 10 with IDE interface can be connected to the personal computer through the input/output port with PCMICA interface.

By the same token, the input/output port of the personal computer providing an interface of IDE, UBS, PCMCIA, or Firewire, or any other more advanced interface developed in the future can connect with the storage device 10 conveniently as soon as the USIB interface conversion device 60 is replaced. Hence, it is only necessary for the user to prepare a data storage device 10 with several USIB interface conversion cables such that the data storage device 10 can connect with an input/output port with any type of interface to save the expense needed and offer a convenient in use.

TABLE 2

| IDE or ATAPI DEVICE PIN OUT ASSIGNMENT | FEMALE MC-36 CONNECTOR PIN OUT ASSIGNMENT | REMARKS |
|---|---|---|
| RESRET | 1 | |
| D7 | 2 | |
| D6 | 3 | |
| D5 | 4 | |
| D4 | 5 | |
| D3 | 6 | |
| D2 | 7 | |
| D1 | 8 | |
| D0 | 9 | |
| +5 V, DEVICE | 10 | +5 V power from the device side |
| IOW | 11 | |
| IOR | 12 | |
| GROUND | 12 | |
| DMAACK | 14 | ATA DMA Acknowledge |
| IRQ | 15 | |
| A1 | 16 | |
| A0 | 17 | |
| CS0 | 18 | |
| GND | 19 | |
| D8 | 20 | |
| D9 | 21 | |
| D10 | 22 | |
| D11 | 23 | |
| D12 | 24 | |
| D13 | 25 | |
| D14 | 26 | |
| D15 | 27 | |
| GROUND | 28 | |
| GROUND | 29 | |
| +12 V | 30 | +12 V from computer or power adapter |
| *IORDY detect | 31 | |
| IORDY/IOCS16 | 32 | |
| +5 V, HOST | 33 | +5 V power from computer side |
| A2 | 34 | |
| CS1 | 35 | |
| DMARKEQ | 36 | ATA DMA Request |

*IORDY detect - the signal comes from device side, +5 V means IORDY on Pin 32, Ground means IOCS16 on Pin 32.

It can be understood from the preceding description that the universal interface conversion device of the present invention has an advantage that a data storage device 10 can connect with the input/output port of a personal computer with any type of interface by way of selecting an USIB interface cable 60 with the interface thereof being identical with the interface of the input/output port without the need of preparing a lot of interface conversion circuit boards 30 and interface cables 40.

While the invention has been described with reference to preferred embodiments thereof, it is to be understood that modifications or variations may be easily made without departing from the spirit of this invention, which is defined in the appended claims.

What is claimed is:

1. A Universal Storage Interface Bus device, comprising:
   an IDE storage device, providing a first interface;
   a ribbon cable having a first connector coupling with the IDE storage device and a second connector;
   an USIB connector conversion board having a third connector, and a fourth connector, the third connector connected to said second connector, the USIB connector conversion board converts an IDE signal of the IDE data storage device into a USIB signal transmitted from the fourth connector, the fourth connector is a standard MC-36 connector; and
   an USIB interface conversion cable, providing a fifth connector, an USIB interface conversion board and a sixth connector, a cable being between and connecting with the USIB interface conversion board and the sixth connector, the fifth connector coupling with said fourth connector, and the sixth connector coupling with an input/output port of a personal computer;
   wherein the IDE storage device is connected to the input/output port by selecting a USIB interface conversion cable.

2. The Universal Storage Interface Bus device according to claim 1, wherein the USIB interface conversion board further comprises an ASIC to convert a signal of the first interface into a signal of a second interface.

3. The Universal Storage Interface Bus device according to claim 2, wherein the second interface is a USB interface.

4. The Universal Storage Interface Bus device according to claim 2, wherein the second interface is a PCMCIA interface.

5. The Universal Storage Interface Bus device according to claim 2, wherein the second interface is a Firewire interface.

6. The Universal Storage Interface Bus device according to claim 1, wherein the first interface is IDE interface.

7. The Universal Storage Interface Bus device according to claim 1, wherein the first, the second, and the third connectors are a 50-pin connector respectively.

8. The Universal Storage Interface Bus device according to claim 1, wherein the fourth and the fifth connectors are a MC-36 connector respectively.

9. The Universal Storage Interface Bus device according to claim 8, wherein the respective MC-36 connector has 36 pins be defined as follows respectively: a 1st pin is RESRET, a 2nd pin is D7, a 3rd pin is D6, a 4th pin is D5, a 5th pin is D4, a 6th pin is D3, a 7th pin is D2, a 8th pin is D1, a 9th pin is D0, a 10th pin is +5V, Device, 11th pin is IOW, 12th pin is IOR, a 13th pin is ground, a 14th pin is DMAACK, a 15th pin is IRQ, a 16th pin is A1, a 17th pin is A0, a 18th pin is CS0, a 19th pin is GND, a 20th pin is D8, a 21st pin is D9, a 22nd pin is D10, a 23rd pin is D11, a 24th in is D12, a 25th in is D13, a 26th pin is D14, a 27th pin is D15, a 28th pin is Ground, a 29th in is Ground, a 30th pin is +12V, a 31st pin is *IORDY, a 32nd pin is IORDY/IOCS16, a 33rd pin is +5V, HOST, a 34th pin is A2, a 35th is a CS1, and a 36th pin is DMAREQ.

\* \* \* \* \*